United States Patent
Mangal et al.

(10) Patent No.: US 11,812,088 B2
(45) Date of Patent: Nov. 7, 2023

(54) SYSTEMS AND METHODS FOR A GEAR-BASED UI TO FACILITATE EFFICIENT NAVIGATION

(71) Applicant: Rovi Guides, Inc., San Jose, CA (US)

(72) Inventors: Anupam Mangal, Bangalore (IN); Amrit Srivastava, Karnataka (IN); Sangeeta Parida, Karnataka (IN); Daina Emmanuel, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/143,174

(22) Filed: Sep. 26, 2018

(65) Prior Publication Data
US 2020/0099975 A1 Mar. 26, 2020

(51) Int. Cl.
*H04N 21/422* (2011.01)
*G06F 3/0362* (2013.01)

(52) U.S. Cl.
CPC ..... *H04N 21/42208* (2013.01); *G06F 3/0362* (2013.01); *H04N 21/42218* (2013.01)

(58) Field of Classification Search
CPC ........ H04N 21/42208; H04N 21/42218; G06F 3/0362
USPC .......................................................... 725/38
See application file for complete search history.

(56) References Cited

U.S. PATENT DOCUMENTS

| | | | |
|---|---|---|---|
| 6,094,237 A * | 7/2000 | Hashimoto | H03J 5/00 348/580 |
| 6,505,194 B1 * | 1/2003 | Nikolovska | G06F 16/73 707/768 |
| 6,857,128 B1 * | 2/2005 | Borden, IV | H04N 21/4821 715/767 |
| 6,910,191 B2 * | 6/2005 | Segerberg | H04N 21/482 715/833 |
| 7,685,619 B1 * | 3/2010 | Herz | H04N 21/4147 715/848 |
| 7,761,892 B2 | 7/2010 | Ellis | |
| 7,907,118 B2 * | 3/2011 | Matsui | G06F 3/0482 725/52 |
| 7,979,879 B2 * | 7/2011 | Kazama | H04N 21/482 725/39 |
| 8,326,115 B2 * | 12/2012 | Murakoshi | H04N 9/8715 715/723 |
| 8,707,354 B1 * | 4/2014 | Moreau | H04N 21/4532 725/37 |
| 8,799,948 B2 * | 8/2014 | Papaspyropoulos | H04N 21/482 725/39 |

(Continued)

*Primary Examiner* — An Son P Huynh
(74) *Attorney, Agent, or Firm* — HALEY GUILIANO LLP

(57) ABSTRACT

Systems and methods for generating a gear-based user interface for display are disclosed. A user equipment device may generate for display a first gear shape, a second gear shape, and a third gear shape. The first gear shape comprises a first plurality of media identifiers, where a first media identifier of the first plurality is selected. The second gear shape comprises a second plurality of media identifiers that are representative of a group indicated by the selected first media identifier, where a second media identifier is selected. The third gear shape comprises a third plurality of options for a media asset indicated by the selected second media identifier. Upon input indicating that the first gear shape is to be rotated, the second gear shape is rotated with the first gear shape based on the rotation of the first gear shape.

22 Claims, 12 Drawing Sheets

(56) References Cited

U.S. PATENT DOCUMENTS

| | | | | |
|---|---|---|---|---|
| 8,832,553 B2* | 9/2014 | Roberts | ............. | H04N 21/4821 |
| | | | | 725/40 |
| 9,113,108 B2 | 8/2015 | Sinha | | |
| 9,377,927 B1* | 6/2016 | Sciammarella | ....... | G06F 3/0482 |
| 2002/0033848 A1* | 3/2002 | Sciammarella | ....... | G06F 3/0485 |
| | | | | 715/838 |
| 2003/0106057 A1* | 6/2003 | Perdon | .................. | H04N 21/47 |
| | | | | 348/565 |
| 2003/0167466 A1* | 9/2003 | Nakamura | ........... | H04N 21/482 |
| | | | | 725/39 |
| 2005/0028198 A1* | 2/2005 | Robbins | ................ | G06T 11/206 |
| | | | | 725/39 |
| 2005/0097606 A1* | 5/2005 | Scott | ...................... | H04N 21/47 |
| | | | | 725/52 |
| 2005/0162397 A1* | 7/2005 | Kwon | .................. | G06F 3/0231 |
| | | | | 345/169 |
| 2006/0066755 A1* | 3/2006 | Kowald | ............ | H04N 21/4312 |
| | | | | 715/788 |
| 2006/0136246 A1* | 6/2006 | Tu | ..................... | H04N 5/44543 |
| | | | | 725/52 |
| 2006/0279541 A1* | 12/2006 | Kim | .................. | H04N 21/4312 |
| | | | | 345/158 |
| 2009/0249393 A1* | 10/2009 | Shelton | ............. | H04N 21/2368 |
| | | | | 375/E7.076 |
| 2009/0293014 A1* | 11/2009 | Meuninck | .......... | H04N 21/4312 |
| | | | | 715/810 |
| 2011/0154402 A1 | 6/2011 | Sinha | | |
| 2011/0296341 A1* | 12/2011 | Koppert | ................. | G06F 16/34 |
| | | | | 715/786 |
| 2014/0068435 A1* | 3/2014 | Miyajima | ............ | G06F 3/0482 |
| | | | | 715/716 |
| 2018/0188801 A1* | 7/2018 | Leppanen | .......... | H04N 1/00453 |

\* cited by examiner

SYSTEMS AND METHODS FOR A GEAR-BASED UI TO FACILITATE EFFICIENT NAVIGATION

BACKGROUND OF THE INVENTION

The present disclosure is directed to user interfaces, and more particularly to user interfaces for the navigation of media content.

SUMMARY

As the amount of available media content proliferates, interfaces for navigating and finding media content must be designed for efficiency and ease of use. In conventional user interfaces, each selection of an entity in the interface loads a new page of the interface, often omitting information from the previous page. A user may need to navigate between multiple pages and listings to reach a desired page, at which point the user may have forgotten information from previous pages. For example, if a user navigates from a channel listing page to a program listing page, and then from the program listing page to a program-specific information page, the user may forget the channels and programs listed on the first two pages when they reach the program-specific information page.

Systems and methods are thus described herein for generating for display a more efficient interface that displays, on a single screen, information that would otherwise be displayed on multiple screens, thereby enabling a more efficient and comprehensive view of the information. Specifically, a gear-based user interface that solves the problems described above is disclosed. In one embodiment, a user equipment device comprising display generator circuitry and control circuitry provides a user interface for media content navigation. In order to efficiently display media information without excessive navigation between pages, the display generator circuitry generates for display a first gear shape, a second gear shape, and a third gear shape. The first gear shape includes a first plurality of media identifiers, where each media identifier of the first plurality corresponds to a cog in the first gear shape. Similarly, the second gear shape includes a second plurality of media identifiers, where each media identifier of the plurality corresponds to a cog in the second gear shape. Additionally, the second plurality of media identifiers is representative of a group indicated by a first selected media identifier in the first plurality of media identifiers. For example, if the first plurality of media identifiers is a group of channels, the second plurality of media identifiers may be a group of programs available on a selected channel. The third gear shape includes a third plurality of options related to a media asset indicated by a second selected media identifier in the second plurality of media identifiers. For example, if the second plurality of media identifiers is a group of programs, the third plurality of options may be playback options available for a selected program. Upon input indicating that the first gear shape is to be rotated, the control circuitry of the user equipment device may cause the display generator circuitry to rotate the second gear shape with the first gear shape, where the characteristics of the rotation of the second gear shape are based on characteristics of the rotation of the first gear shape.

In some embodiments, the first gear shape includes a first selection position and the second gear shape includes a second selection position. The first selected media identifier of the first plurality of media identifiers may correspond to a first cog in the first selection position. The second selected media identifier of the second plurality of media identifiers may correspond to a second cog in the second selection position.

In some embodiments, the display generator circuitry generates for display a fourth gear shape that is smaller than the first gear shape and overlays the first gear shape. The display generator circuitry also generates for display a fifth gear shape that is smaller than the second gear shape and overlays the second gear shape. The fourth gear shape includes the first selected media identifier, and the fifth gear shape includes the second selected media identifier. In some embodiments, the first gear shape, the second gear shape, and the third gear shape are of a first size, and the fourth gear shape and the fifth gear shape are of a second size.

In some embodiments, further upon input indicating that the first gear shape is to be rotated, the control circuitry, based on the rotation of the first gear shape, causes the display circuitry to update the fourth gear shape based on an updated first media identifier of the first gear shape. Additionally, the control circuitry, based on the rotation of the second gear shape, causes the display circuitry to update the fifth gear shape based on an updated second media identifier of the second gear shape.

In some embodiments, the control circuitry selects, based on the rotation of the first gear shape, an updated first media identifier of the first plurality of media identifiers of the first gear shape. The control circuitry determines, based on the updated first media identifier, a fourth plurality of media identifiers that are representative of a group indicated by the updated first media identifier. For example, if the updated first media identifier is a newly selected channel, the control circuitry may determine the fourth plurality of media identifiers to be a group of programs offered by the newly selected channel. The control circuitry causes the display generator circuitry to generate for display the second gear shape with the fourth plurality of media identifiers replacing the second plurality of media identifiers.

In some embodiments, the control circuitry, when determining the fourth plurality of media asset identifiers, determines whether the first gear shape has stopped rotating. If the first gear shape has stopped rotating, the control circuitry detects that a third cog corresponding to the updated first media identifier is in the first selection position of the first gear shape. The control circuitry transmits a request that includes the updated first media identifier and is for the fourth plurality of media identifiers that is representative of a group indicated by the updated first media identifier. In response to the request, the control circuitry receives the fourth plurality of media identifiers.

In some embodiments, the first plurality of media identifiers is a plurality of categories of media assets and the second plurality of media identifiers is a plurality of subcategories of media assets. In some embodiments, the control circuitry retrieves the plurality of categories of media assets from a database. The control circuitry determines the first media identifier corresponding to the first cog corresponds to a first category of the plurality of categories. The control circuitry retrieves a plurality of subcategories of the first category from the database. After the categories and subcategories have been retrieved, the control circuitry causes the display generator circuitry to generate for display the plurality of categories on the first gear shape and the plurality of subcategories on the second gear shape.

In some embodiments, the first plurality of media identifiers corresponds to a plurality of channels, the second plurality of media identifiers corresponds to a plurality of programs, and the third plurality of options corresponds to a plurality of program options.

In some embodiments, the first plurality of media identifiers corresponds to a first plurality of electronic files and/or directories, the second plurality of media identifiers corresponds to a second plurality of electronic files and/or directories, and the third plurality of options corresponds to a plurality of file and/or directory options.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

"Media asset" and "content" in the context of the present disclosure should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, electronic folders, digital files, playlists, websites, articles, books, electronic books, blogs, chat sessions, social media, applications, games, and/or any other media or multimedia and/or combination of the same.

A "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

Metadata may include program information, media guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 1:
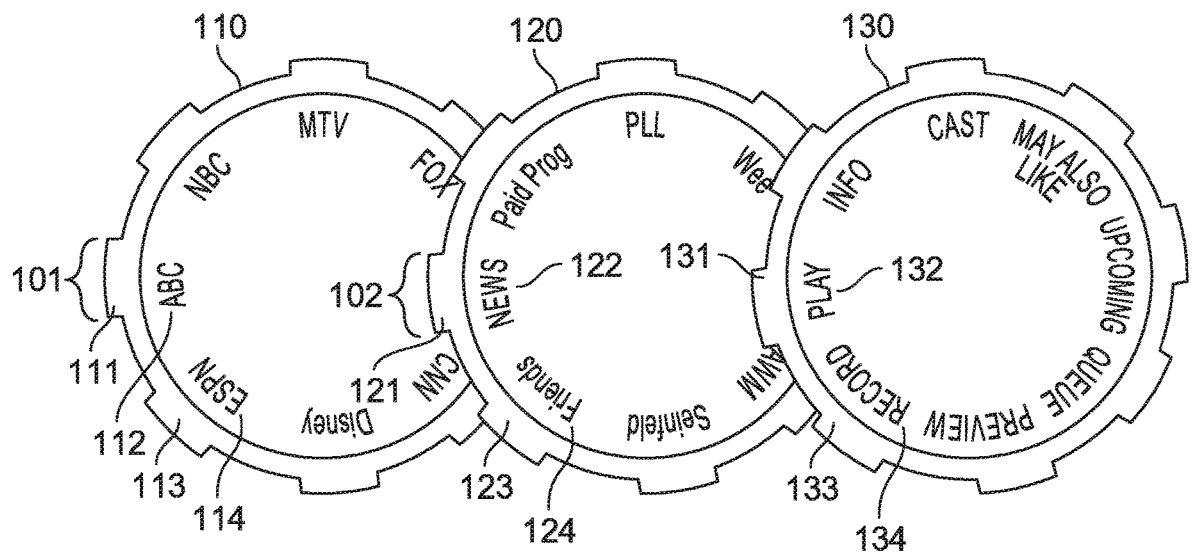
FIG. 1 shows an illustrative example of a gear-based user interface for media content navigation, in accordance with some embodiments of the disclosure.
Figure 1:
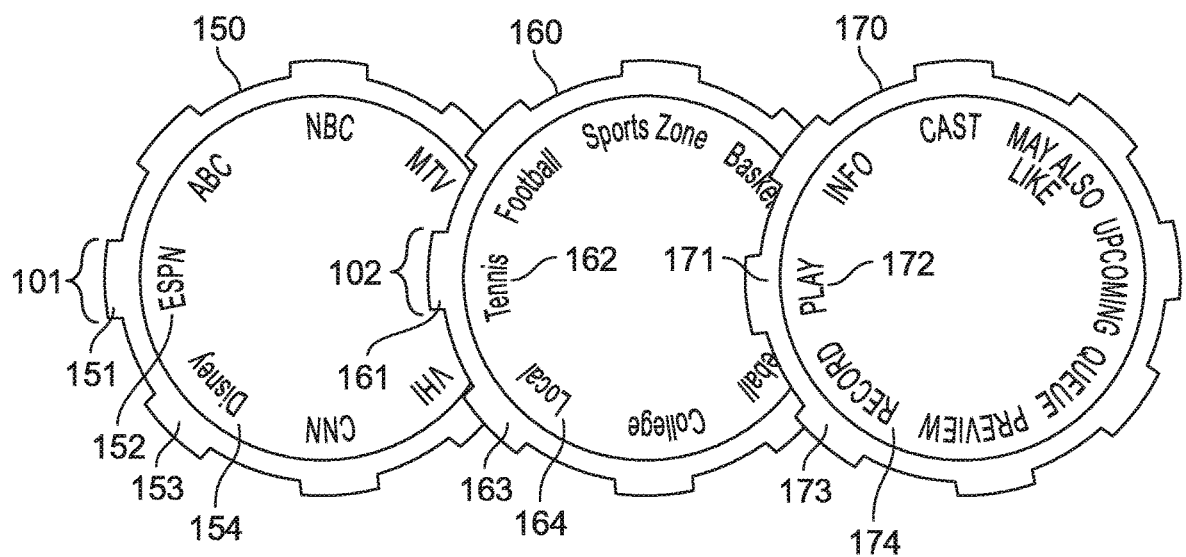

FIG. 1 shows an illustrative example of a gear-based user interface for media content navigation, in accordance with some embodiments of the disclosure. The gear-based user interface may be generated for display by a user equipment device comprising display generator circuitry and control circuitry. The user equipment device may be a media device described above. In one example, a user may be accessing content on a user equipment device such as a smartphone, which generates the user interface for display on the display screen of the smartphone.

Interface states 100 and 140 are shown in FIG. 1. In interface state 100, the user equipment device generates for display a first gear shape 110, a second gear shape 120, and a third gear shape 130. First gear shape 110 includes a first plurality of media identifiers including media identifier 112 ("ABC") and media identifier 114 ("ESPN"). Each media identifier corresponds to a cog in the gear shape. For example, media identifier 112 corresponds to cog 111 and media identifier 114 corresponds to cog 113. Cog 111 is depicted in first selection position 101.

Second gear shape 120 includes a second plurality of media identifiers including media identifier 122 ("News"), which corresponds to cog 121, and media identifier 124 ("Friends"), which corresponds to cog 123. Cog 121 is depicted in second selection position 102. The second plurality of media identifiers is representative of a group indicated by the media identifier for a cog in the first selection position (i.e., media identifier 112 ("ABC") corresponding to cog 111 in first selection position 101). In the depicted example, "News" and "Friends" are part of a group (i.e., programs) indicated by "ABC".

Third gear shape 130 includes a third plurality of options including option 132 ("PLAY") and option 134 ("RECORD"). Option 132 corresponds to cog 131 and option 134 corresponds to cog 133. The third plurality of options includes media options for a media asset indicated by the media identifier for a cog in the second selection position (i.e., media identifier 122 ("NEWS") corresponding to cog 121 in second selection position 102). By selecting an option of the third gear shape, a user may be able to perform an action, such as a playback action, on a media asset. Similar to first gear shape 110 and second gear shape 120, third gear shape 130 may have a selection position (not shown). In this example, a user may select an option by rotating a gear until the desired option is in the selection position of the third gear shape. In some embodiments, the user may only be able to rotate a gear in a specific direction (e.g., clockwise). In another example, the user equipment device may provide other means for a user to select an option, such as through voice command, touchscreen selection, cursor selection, or other means.

Interface state 140 in FIG. 1 shows the gear shapes of interface state 100 after a rotation of first gear shape 110. At interface state 140, first gear shape 150, second gear shape 160, and third gear shape 170 correspond to post-rotation versions of first gear shape 110, second gear shape 120, and third gear shape 130, respectively. Rotation of gear shapes is described in further detail below in relation to FIG. 5.

First gear shape 150 includes the first plurality of media identifiers of first gear shape 110. As shown, the first plurality of media identifiers includes media identifier 152 ("ESPN") (corresponding to media identifier 114 at interface state 100) and media identifier 154 ("Disney"). Each media identifier corresponds to a cog in the gear shape. For example, media identifier 152 corresponds to cog 151 and media identifier 154 corresponds to cog 153. Cog 151 is depicted in first selection position 101. Notably, media identifier 152 ("ESPN") has become the media identifier corresponding to the cog in first selection position 101 as a result of the rotation between interface states 100 and 140. As a result, media identifier 152 ("ESPN") now indicates the second plurality of media identifiers of the second gear shape.

Second gear shape 160 includes a new second plurality of media identifiers that is different from second gear shape 120. The new second plurality of media identifiers includes, for example, media identifier 162 ("Tennis"), corresponding to cog 161, and media identifier 164 ("Local"), corresponding to cog 163. Cog 161 is in second selection position 102. This new second plurality of media identifiers is representative of a group indicated by the media identifier for a cog in the first selection position (i.e., media identifier 152 ("ESPN") corresponding to cog 151 in first selection position 101). In the depicted example, "Tennis" and "Local" are part of a group (i.e., programs) indicated by "ESPN".

Third gear shape 170 includes a third plurality of options including option 172 ("PLAY"), corresponding to cog 171, and option 174 ("RECORD"), corresponding to cog 173. The third plurality of options are media options for a media asset indicated by the media identifier for a cog in the second selection position (i.e., media identifier 162 ("Tennis") corresponding to cog 161 in second selection position 102). As shown, the third plurality of options may be the same for different media assets such as those indicated by media identifiers 122 ("News") and 162 ("Tennis"). In another example, the third plurality of options may vary between different media assets. For example, one media asset may have fewer options than a second media asset.

In some embodiments, there may be additional gear shapes to the three shown in FIG. 1, for example to represent additional groups and/or subgroups. Although the gear shapes of FIG. 1 are each shown to be the same size, with the same number of cogs, the size and number of cogs of one gear shape may vary from another gear shape. In one example, the number of cogs in a gear shape may be determined by the number of media identifiers to be included in that gear shape. In another example, the number of cogs in a gear shape may be set to a pre-determined number. If the number of media identifiers to be included in the gear shape is less than the pre-determined number, there may be one or more cogs that are without media identifiers, or unlabeled, in the gear shape. If the number of media identifiers to be included in the gear shape is greater than the pre-determined number, the user equipment device may, for example, cycle through the media identifiers to be displayed or selectively display media identifiers based on a particular criterion (e.g., rating, audience popularity, availability, etc.).

Figure 2:
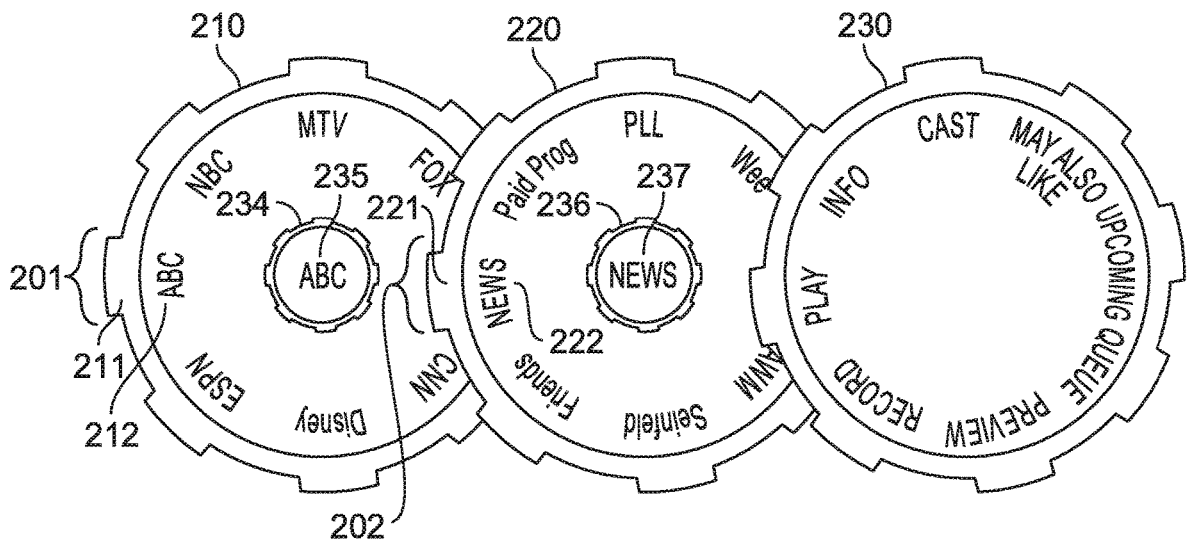
FIG. 2 shows an illustrative example of another gear-based user interface for media content navigation, in accordance with some embodiments of the disclosure.
Figure 2:
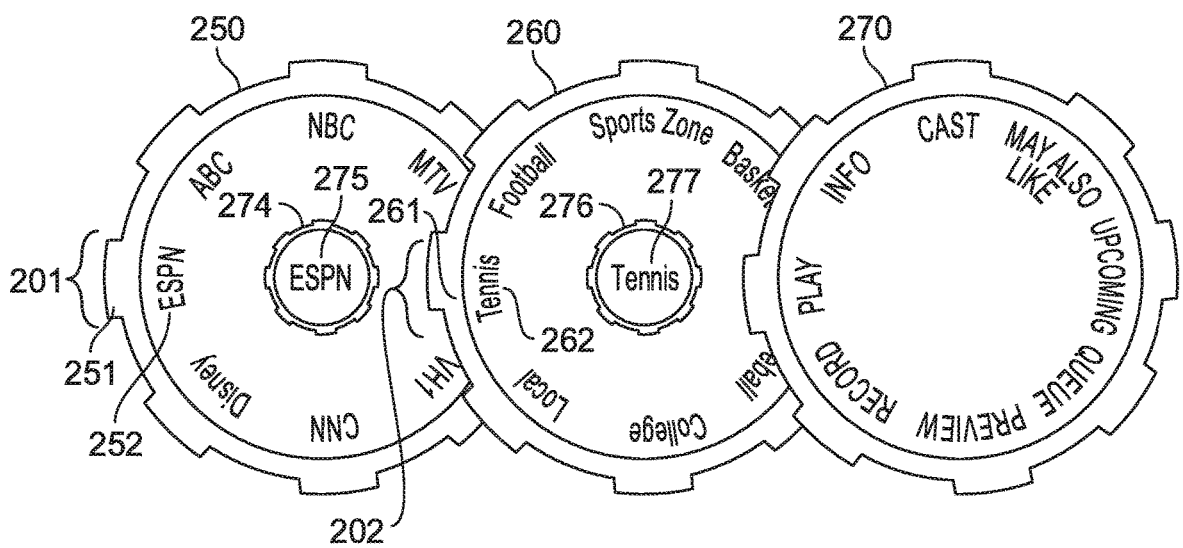

FIG. 2 shows an illustrative example of another gear-based user interface for media content navigation, in accordance with some embodiments of the disclosure. As in FIG. 1, the gear-based user interface may be generated for display by a user equipment device comprising display generator circuitry and control circuitry. Interface states 200 and 240 are shown in FIG. 2.

In interface state 200, the user equipment device generates for display a first gear shape 210, a second gear shape 220, a third gear shape 230, a fourth gear shape 234, and a fifth gear shape 236. First gear shape 210 includes a first plurality of media identifiers including first media identifier 212 ("ABC"). First media identifier 212 corresponds to cog 211 in first selection position 201. Fourth gear shape 234 is overlaid onto first gear shape 210 and includes media identifier 235 ("ABC"), which corresponds to first media identifier 212 ("ABC"). Thus, fourth gear shape 234 indicates which media identifier in first gear shape 210 is currently being selected. Further, the selected media identifier shown in the first and fourth gear shapes determines the group of media identifiers included in the second gear shape.

Second gear shape 220 includes a second plurality of media identifiers including second media identifier 222 ("News"). Second media identifier 222 corresponds to cog 221 in second selection position 202. The second plurality of media identifiers (e.g., "News", "Paid Prog", "PLL", etc.) are of a group indicated by the first media identifier ("ABC") with a cog in first selection position 201. Fifth gear shape 236 is overlaid onto second gear shape 220 and includes media identifier 237 ("News"), which corresponds to second media identifier 237 ("News"). Thus, fifth gear shape 236 indicates which media identifier in second gear shape 220 is currently being selected. The selected media identifier shown in the second and fifth gear shapes determines the media options included in third gear shape 230.

Interface state 240 in FIG. 2 shows the gear shapes of interface state 200 after a rotation of first gear shape 210. At interface state 240, first gear shape 250, second gear shape 260, third gear shape 270, fourth gear shape 274, and fifth gear shape 276 correspond to post-rotation versions of first gear shape 210, second gear shape 220, third gear shape 230, fourth gear shape 234, and fifth gear shape 236, respectively. First gear shape 250 includes a first plurality of media identifiers including first media identifier 252 ("ESPN") corresponding to cog 251 in first selection position 201. Fourth gear shape 274 includes media identifier 275 ("ESPN"), which matches first media identifier 252 in the first gear shape and indicates that first media identifier 252 is being selected (e.g., to determine a plurality of media identifiers to be included in a second gear shape). Accordingly, the rotation of first gear shape 210 in interface state 200 to interface state 240 has resulted in the first media identifier of a cog in first selection position 201 to be updated from first media identifier 212 ("ABC") to first media identifier 252 ("ESPN"). Additionally, media identifier 235 ("ABC") in fourth gear shape 234 in interface state 200 has updated to media identifier 275 ("ESPN") in fourth gear shape 274 in interface state 240 in accordance with the updates to the first gear shapes.

Second gear shape 260 includes a second plurality of media identifiers including second media identifier 262 ("Tennis") corresponding to cog 261 in second selection position 202. The second plurality of media identifiers is representative of a group indicated by first media identifier 252, and accordingly media identifier 275 (both "ESPN"). For example, the second plurality of media identifiers ("Tennis", "Football", "SportsZone", etc.) are of a group of programs indicated by "ESPN". Fifth gear shape 276 includes media identifier 277 ("Tennis"), which matches second media identifier 262 in the second gear shape and indicates that second media identifier 260 is being selected (e.g., to determine a plurality of options to be included in a third gear shape). Thus, fifth gear shape 276 indicates which media identifier in second gear shape 260 is currently being selected. The selected media identifier shown in the second and fifth gear shapes determines the media options included in third gear shape 270.

Figure 3:
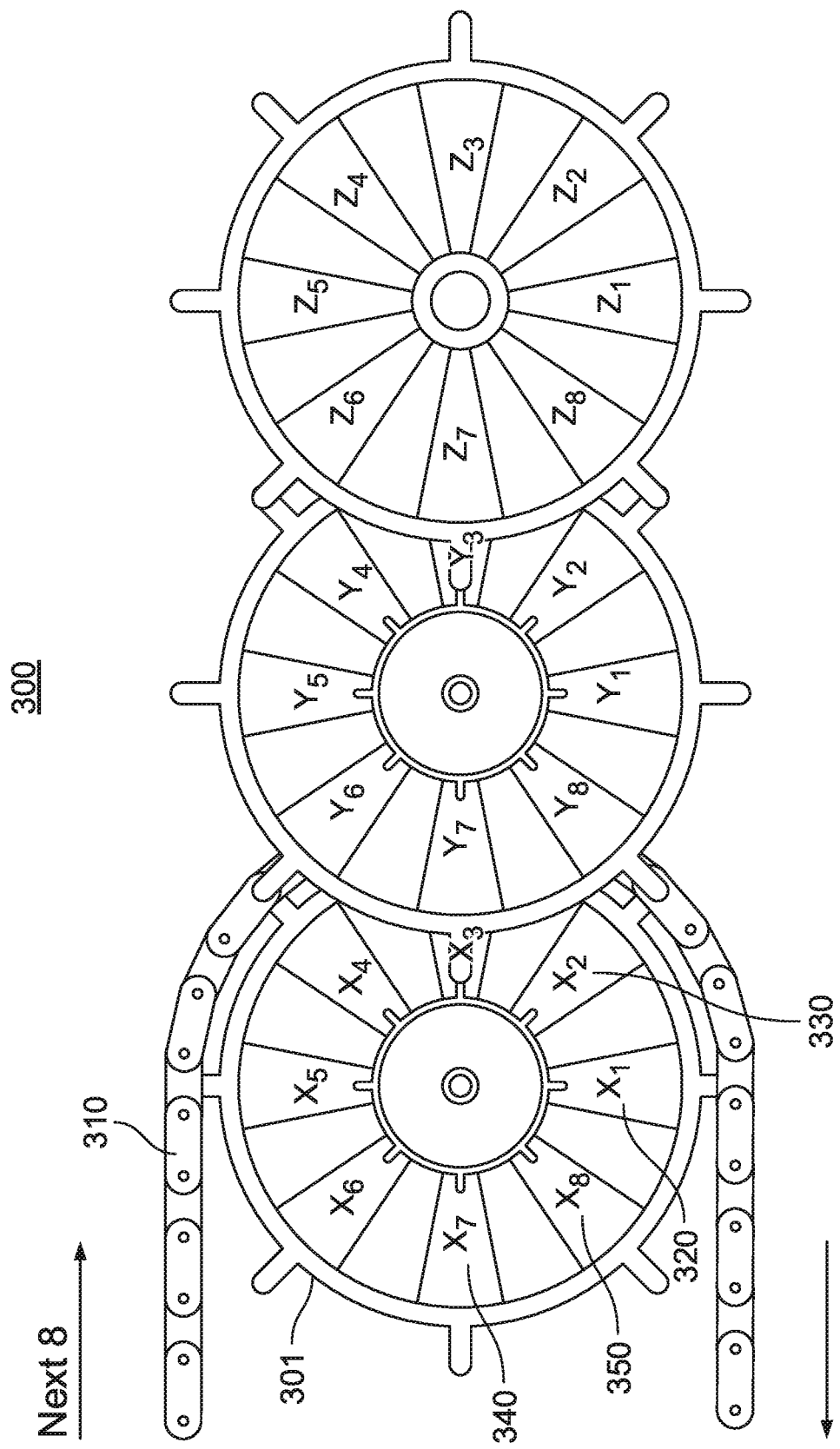
FIG. 3 shows an illustrative example of another gear-based user interface for media content navigation comprising a gear chain, in accordance with some embodiments of the disclosure.

FIG. 3 shows an illustrative example of a gear-based user interface for media content navigation, in accordance with some embodiments of the disclosure. In some situations, there may be more media identifiers and/or other data available than can be displayed at once on a gear shape. A gear chain 310 may be added to first gear shape 301 to enable an intuitive expansion or rotation of media identifiers that are displayed on the gear shape. In one example, clicking on gear chain 310 at a top area of the gear chain may cause the first gear shape to rotate in a clockwise direction and update the displayed media identifiers (e.g., "X1" through "X8") to another set of media identifiers (e.g., "X9" through "X16", not shown). Similarly, clicking on gear chain 310 at a bottom area of the gear chain may cause the first gear shape to rotate in a counterclockwise direction and update the displayed media identifiers (e.g., "X1" through "X8") to yet another set of media identifiers (e.g., "X17" through "X24"). In another example, activating gear chain 310 (e.g., by clicking a top or bottom area of the gear chain) may result in a more incremental rotation of the media identifiers. For example, activating gear chain 310 to rotate first gear shape 301 in a clockwise direction may result in media identifier 330 ("X2") rotating to the position of media identifier 320 ("X1") and media identifier 320 ("X1") being removed from the gear shape. Similarly, upon activation of the gear chain, media identifier 350 ("X8") may rotate to the original position of media identifier 340 ("X7") and a new media identifier (e.g., "X9") may be displayed at the original position of media identifier 350 ("X8"), thereby rotating in a previously undisplayed media identifier on the gear shape. In some embodiments, gear chain 310 may be activated to rotate via a touchscreen input or a voice command.

Figure 4:
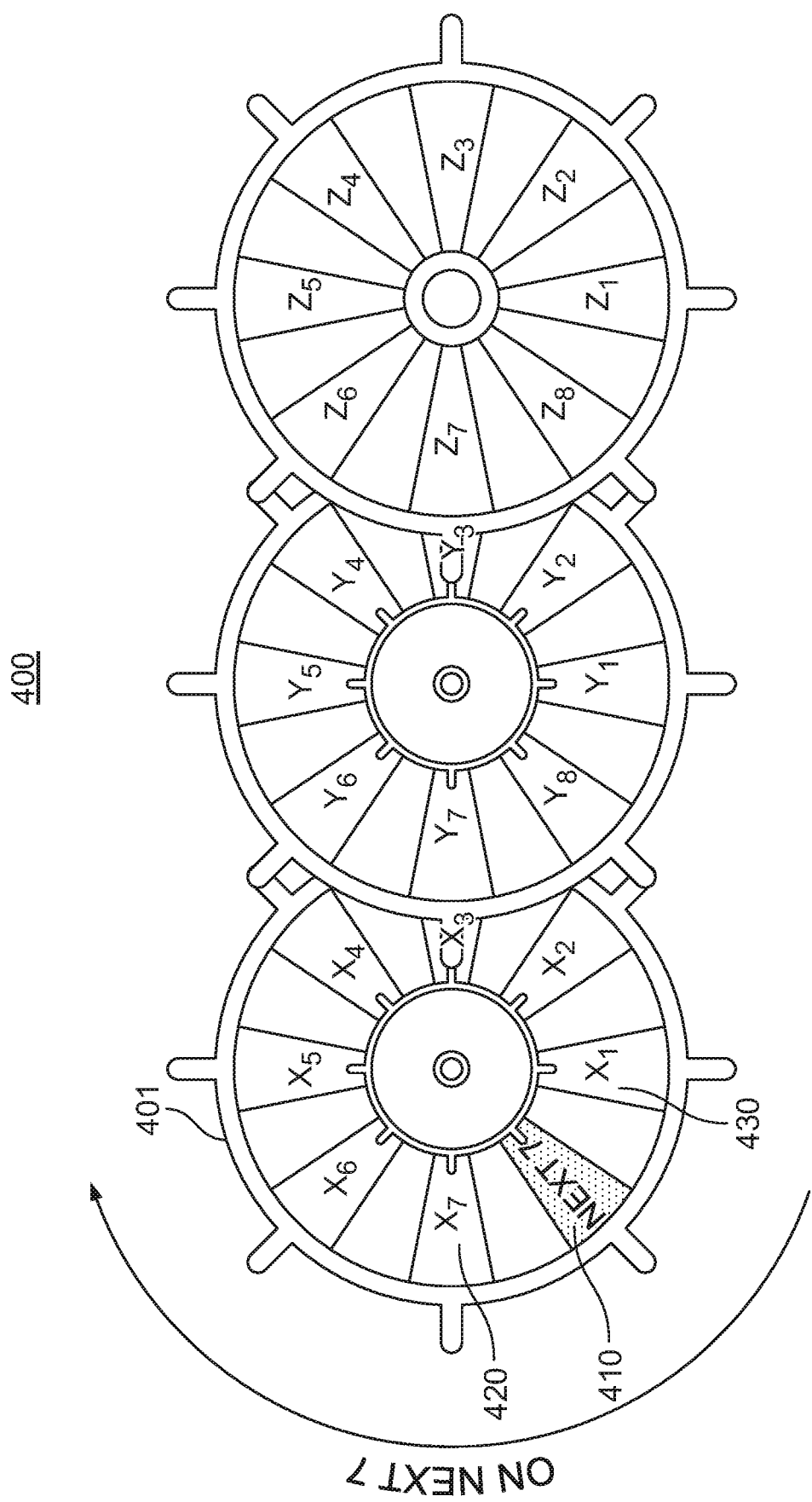
FIG. 4 shows an illustrative example of another gear-based user interface for media content navigation comprising a reserved gear position, in accordance with some embodiments of the disclosure.

FIG. 4 shows an illustrative example of a gear-based user interface for media content navigation, in accordance with some embodiments of the disclosure. As discussed in relation to FIG. 3, there may sometimes be more media identifiers and/or other data available than can be displayed at once on a gear shape. A reserved gear position 410 may be added to first gear shape 401 to enable an intuitive expansion or rotation of media identifiers that are displayed on the gear shape. For example, media identifier 410 (labeled "Next 7") may, upon selection, replace the displayed media identifiers with another set of media identifiers. For example, media identifier 420 ("X7") may be in a first selection position of first gear shape 401. Upon rotation of the first gear shape, media identifier 410 ("Next 7") may be in the first selection position and therefore be selected, resulting in the displayed media identifiers (i.e., 420 ("X7"), 430 ("X1"), etc.) to be replaced with another set of media identifiers (e.g., "X8" through "X14"). In another embodiment (not shown), there may be multiple reserved gear positions. For example, there may be a first gear position (e.g., "Next 6") and a second gear position (e.g., "Last 6") that, upon selection, result in the display of the next set or previous set of media identifiers on the gear shape.

Figure 5:
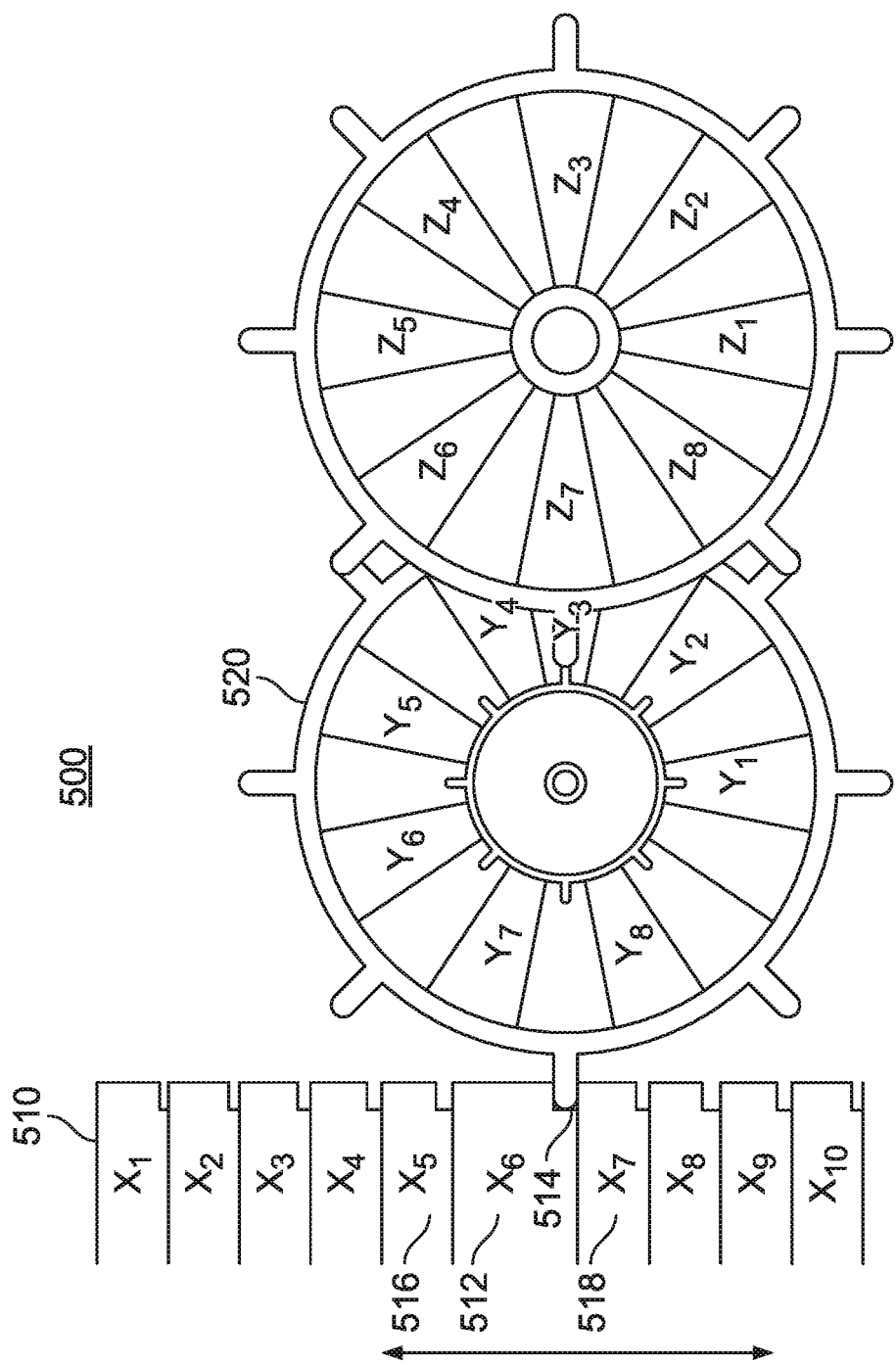
FIG. 5 shows an illustrative example of another gear-based user interface for media content navigation comprising a continuous track, in accordance with some embodiments of the disclosure.

FIG. 5 shows an illustrative example of a gear-based user interface for media content navigation, in accordance with some embodiments of the disclosure. As discussed in relation to FIGS. 3 and 4, there may sometimes be more media identifiers and/or other data available than can be displayed at once on a gear shape. A continuous track 510 may replace a gear shape to enable an intuitive expansion or rotation of media identifiers that are displayed. Continuous track 510 may be configured to, upon user input such as a touchscreen input, input click, or voice command, shift in an upward or downward direction to rotate the displayed media identifiers. For example, upon user input to shift continuous track 510 in an upward direction, the displayed media identifiers ("X1" through "X10") may rotate such that the displayed media identifiers are updated (e.g., to "X2" through "X11"). Similar to the first gear shapes discussed above, continuous track 510 may have a first selection position, for example indicated by notch 514, shown engaging with second gear shape 520. The currently engaged tread of first media identifier 512 ("X6") in the first selection position may be larger in size than the other treads of the continuous track to emphasize the selection of the currently engaged tread. In some embodiments, upon user input to shift the continuous track upward (e.g., by clicking on the continuous track on or above the currently engaged tread), media identifier 518 ("X7") shifts to the first selection position. Similarly, upon user input to shift the continuous track downward (e.g., by clicking on the continuous track below the currently engaged tread), media identifier 516 ("X5") may shift to the first selection position. The shift of the continuous track and change in media identifier in the first selection position may in turn cause second gear shape 520 to update its displayed media identifiers.

Figure 6:
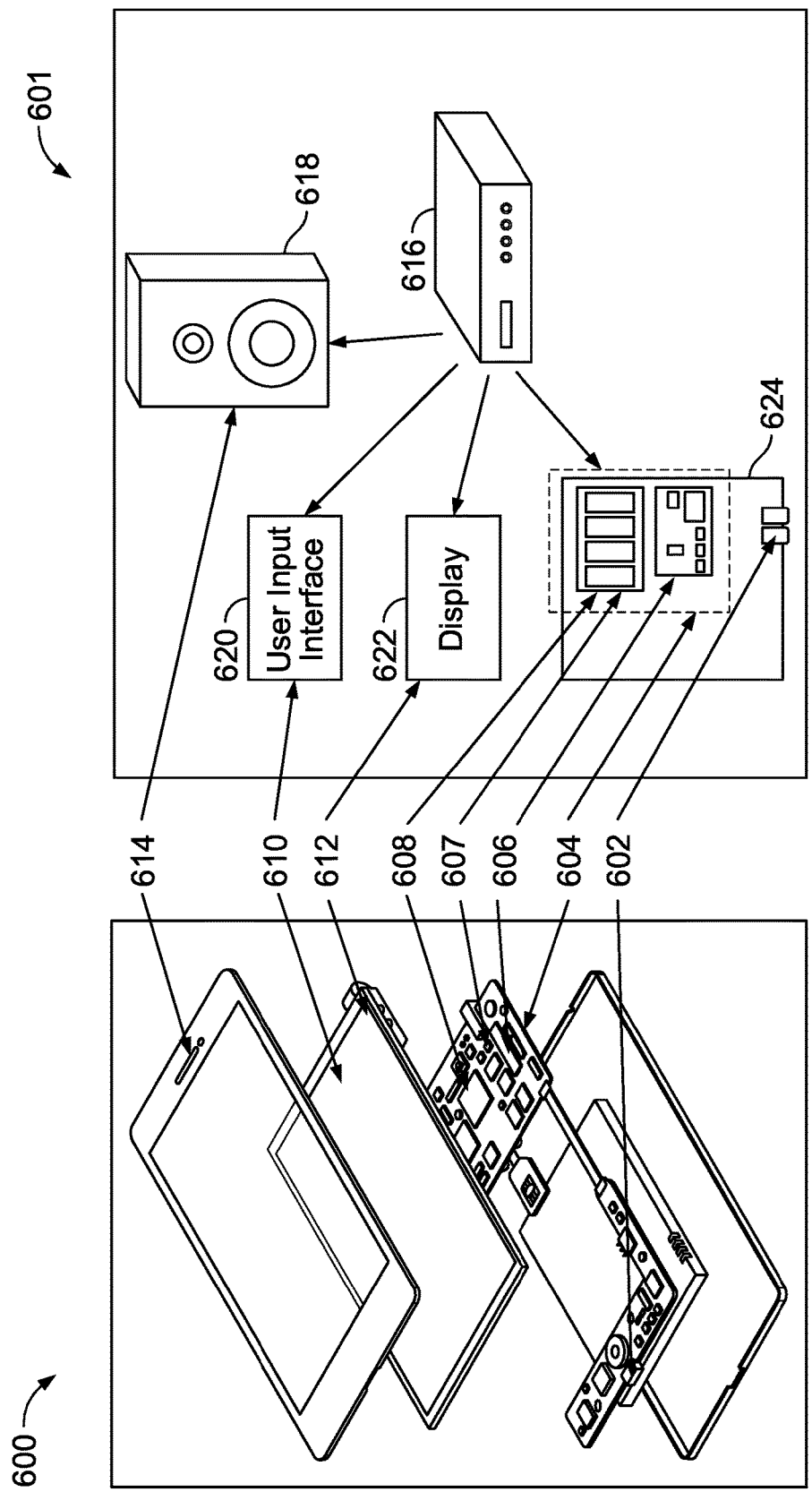
FIG. 6 is a diagram of an illustrative user equipment device in accordance with some embodiments of the disclosure.

FIG. 6 shows a generalized embodiment of illustrative media devices 600 and 601. As depicted, media device 600 may be a smartphone or tablet, whereas media device 601 may be a home media system that includes equipment device 616 (e.g., a set-top box, CPU, video-game console, etc.) powered by processor 624. Media devices 600 and 601 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606, display generator circuitry 607, and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Processing circuitry 606 may include display generation circuitry 607 or be separate from display generation circuitry 607. Display generation circuitry 607 may include display generation functionalities that enable generations for display on displays 612 and/or 622. In some embodiments, control circuitry 604 executes instructions for a user equipment device and/or application stored in memory (i.e., storage 608). Specifically, control circuitry 604 may be instructed by a user equipment device and/or application to perform the functions discussed above and below.

In client-server based embodiments, control circuitry 604 may include communications circuitry suitable for communicating with a media guidance application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, hard drives, optical drives, solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 7, may be used to supplement storage 608 or instead of storage 608.

A user may send instructions to control circuitry 604 using user input interface 610 of media device 600 or user input interface 620 of media device 601. User input interface 610 and user input interface 620 may be any suitable user interface, such as a remote control, mouse, trackball, keypad, keyboard, touch screen, touchpad, stylus input, joystick, voice recognition interface, or other user input interfaces. Display 610 may be a touchscreen or touch-sensitive display. In such circumstances, user input interface 610 may be integrated with or combined with display 612. Display 622 may be provided as a stand-alone device or integrated with other elements of media device 601. Speakers 614 may be provided as integrated with other elements of media device 600. In the case of media device 601, speakers 618 may be stand-alone units (e.g., smart speakers). The audio component of videos and other content displayed on display 622 may be played through speakers 618. In some embodiments, the audio may be distributed to a receiver (not shown), which processes and outputs the audio via speakers 618.

The media guidance application may be implemented using any suitable architecture. For example, it may be a stand-alone application wholly implemented on media device 600. The media guidance application and/or any instructions for performing any of the embodiments discussed herein may be encoded on computer readable media. Computer readable media includes any media capable of storing data. In some embodiments, the media guidance application is a client-server based application. Data for use by a thick or thin client implemented on media device 600 or media device 601 is retrieved on-demand by issuing requests to a server remote to the media device 600 or media device 601, respectively. For example, media device 600 may receive inputs from the user via input interface 610 and transmit those inputs to the remote server for processing and generating the corresponding outputs. The generated output is then transmitted to media device 600 for presentation to the user.

Figure 7:
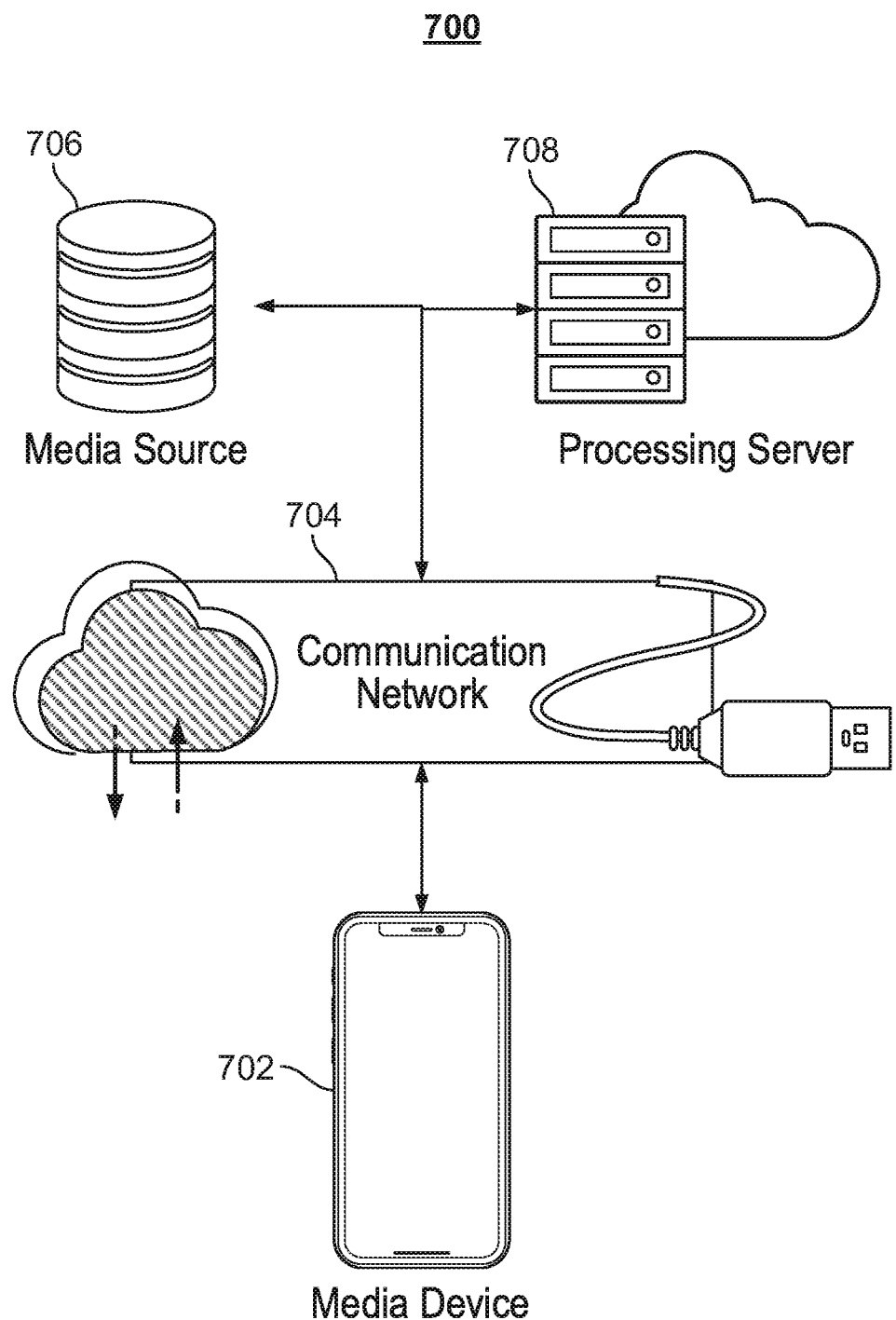
FIG. 7 is a diagram of an illustrative media system in accordance with some embodiments of the disclosure.

FIG. 7 is a diagram of an illustrative media system in accordance with some embodiments of the disclosure. Media device 600 and media device 601 of FIG. 6 can be implemented in system 700 of FIG. 7 as media device 702. Media devices may function as a standalone device or may be part of a network of devices. Various network configurations of devices may be implemented and are discussed in more detail below. In system 700, there may be multiple media devices but only one of each is shown in FIG. 7 to avoid overcomplicating the drawing. In addition, each user may utilize more than one type of media device and also more than one of each type of media device.

Media device 702 may be coupled to communication network 704. Communication network 704 may be one or more networks including the Internet, a mobile phone network, mobile voice or data network (e.g., a 4G or LTE network), cable network, public switched telephone network, or other types of communications network or combinations of communications networks. Media source 706, processing server 708, and media device 702 may be connected to communication path 704 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between media device 702, media source 706 and processing server 708, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 704.

System 700 includes media source 706 coupled to communication network 704. There may be more than one of media source 706, but only one is shown in FIG. 7 to avoid overcomplicating the drawing. Media source 706 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Media source 706 may be the originator of content (e.g., a television broadcaster, a Webcast provider, etc.) or may not be the originator of content (e.g., an on-demand content provider, an Internet provider of content of broadcast programs for downloading, etc.). Media source 706 may include cable sources, satellite providers, on-demand providers, Internet providers, over-the-top content providers, or other providers of content. Media source 706 may also include a remote media server used to store different types of content (including video content selected by a user), in a location remote from any of the media devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety. Media source 706 may also provide metadata.

Media guidance applications may be, for example, stand-alone applications implemented on media devices. For example, a media guidance application may be implemented as software or a set of executable instructions which may be stored in storage 608, and executed by control circuitry 604 of a media device 702. In some embodiments, media guidance applications may be client-server applications where only a client application resides on the media device, and a server application resides on processing server 708. For example, media guidance applications may be implemented partially as a client application on control circuitry 604 of media device 702 and partially on processing server 708 as a server application running on control circuitry of processing server 708. When executed by control circuitry of processing server 708, the media guidance application may instruct the control circuitry to generate the media guidance application output (e.g., gear shapes for a user interface) and transmit the generated output to media device 702. The server application may instruct the control circuitry of the media source 706 to transmit metadata for storage on media device 702. The client application may instruct control circuitry of the receiving media device 702 to generate the media guidance application output.

Media device 702 may operate in a cloud computing environment to access cloud services. In a cloud computing environment, various types of computing services for content sharing, storage or distribution (e.g., audio sharing sites or social networking sites) are provided by a collection of network-accessible computing and storage resources, referred to as "the cloud." Cloud resources may be accessed by media device 702 using, for example, a web browser, a media guidance application, a desktop application, a mobile application, and/or any combination of access applications of the same. Media device 702 may be a cloud client that relies on cloud computing for application delivery, or the media device may have some functionality without access to cloud resources. For example, some applications running on media device 702 may be cloud applications, i.e., applications delivered as a service over the Internet, while other applications may be stored and run on the media device.

In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, media devices can use cloud resources for processing operations such as the processing operations performed by processing circuitry described in relation to FIG. 6.

Figure 8:
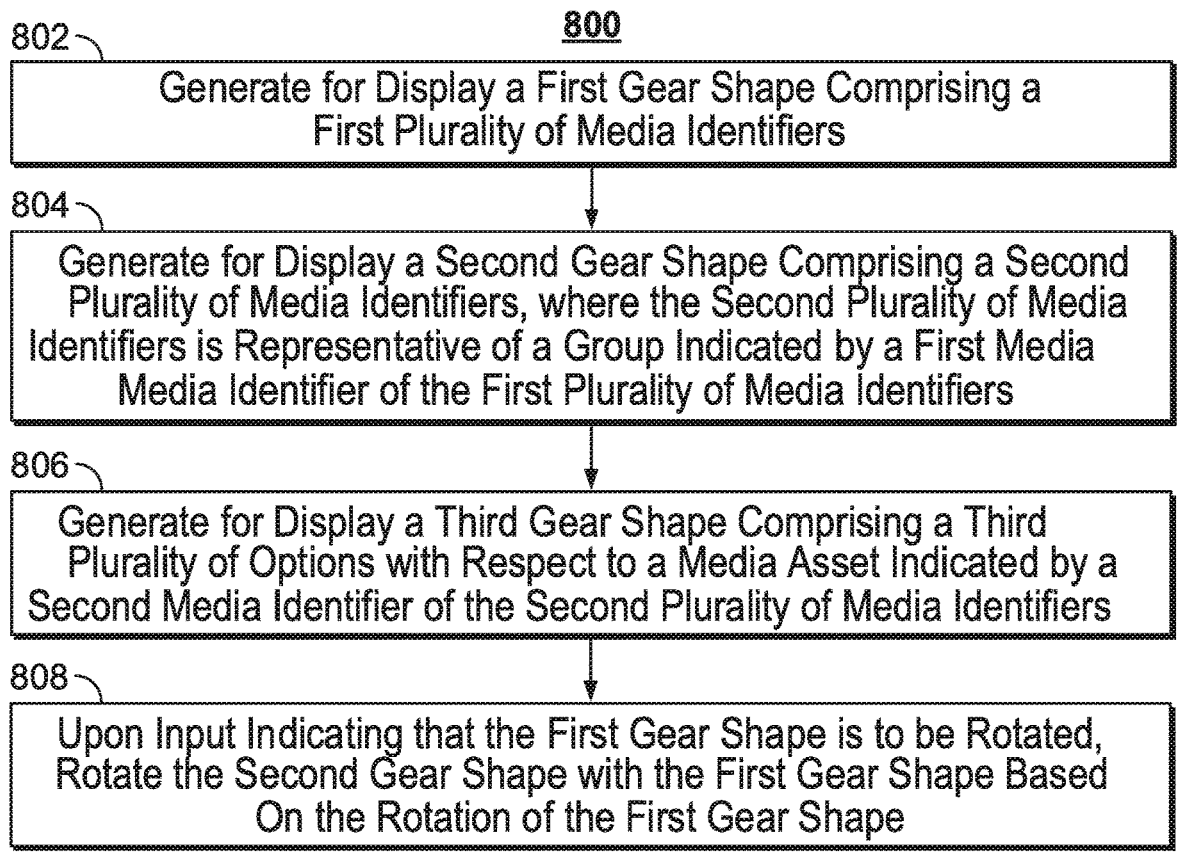
FIG. 8 is a flowchart of an illustrative process for generating for display a gear-based user interface for media content navigation, in accordance with some embodiments of the disclosure.

FIG. 8 is a flowchart of an illustrative process 800 for generating for display a gear-based user interface for media content navigation, in accordance with some embodiments of the disclosure. Many elements of process 800 have been described above with respect to FIG. 1, and those descriptions have full force and effect with respect to the below description of process 800, and thus details on previously described elements are omitted for the sake of brevity.

At 802, control circuitry 604 generates for display a first gear shape comprising a first plurality of media identifiers. Control circuitry 604 may be on media device 702, on a local device connected to the media device (e.g., a display device), or any suitable combination thereof. The first plurality of media identifiers may be retrieved from storage 608, media source 706, or another source. The first plurality of media identifiers may be displayed via representative text or icons, where an icon may include an image (e.g., a logo), text, or both. As described above in relation to FIG. 1, the media identifiers in the first plurality correspond to cogs of the first gear shape.

At 804, control circuitry 604 generates for display a second gear shape comprising a second plurality of media identifiers, where the second plurality of media identifiers is representative of a group indicated by a first media identifier of the first plurality of media identifiers. At 806, control circuitry 604 generates for display a third gear shape comprising a third plurality of options with respect to a media asset indicated by a second media identifier of the second plurality of media identifiers. The determination of the first media identifier and the second media identifier are discussed in more detail below in relation to FIG. 6.

At 808, control circuitry 604, upon input indicating that the first gear shape is to be rotated, rotates the second gear shape with the first gear shape based on the rotation of the first gear shape. For example, the rotation of the second gear shape based on the rotation of the first gear shape may be the scenarios described in FIGS. 1 and 2. Rotating a gear shape may involve, for example, changing the positions of each media identifier in the gear shape by some number of positions. For example, each media identifier may be shifted in position to the position of the media identifier originally two cogs away in the clockwise direction. In some embodiments, rotating a gear shape may involve an image rotation of the entire gear shape, for example using bilinear interpolation or another method. Gear shape rotations may occur simultaneously or one after another. In some embodiments, rotation of a respective gear may only affect the rotation or potential rotation of gears with a particular spatial relationship with the first gear (e.g., gears to right of the respective gear) and not affect the rotation of gears with a different spatial relationship with the respective gear (e.g., gears to the left of the respective gear). For example, upon input indicating that the second gear is to be rotated, control circuitry 604 may rotate the second gear, rotate the third gear based on the rotation of the second gear, and refrain from rotating the first gear.

Input indicating that a gear shape is to be rotated may include, for example, a voice command from a user. In another example, input may be provided by tactile actions by a user on a touchscreen display. In still another example, input may be provided with a remote device that can select various components of the user interface. For example, the remote device may have arrow buttons that allow rotation of a gear shape and an "OK" or "SELECT" button that makes a selection and/or stops rotation of the gear shape.

Figure 9:
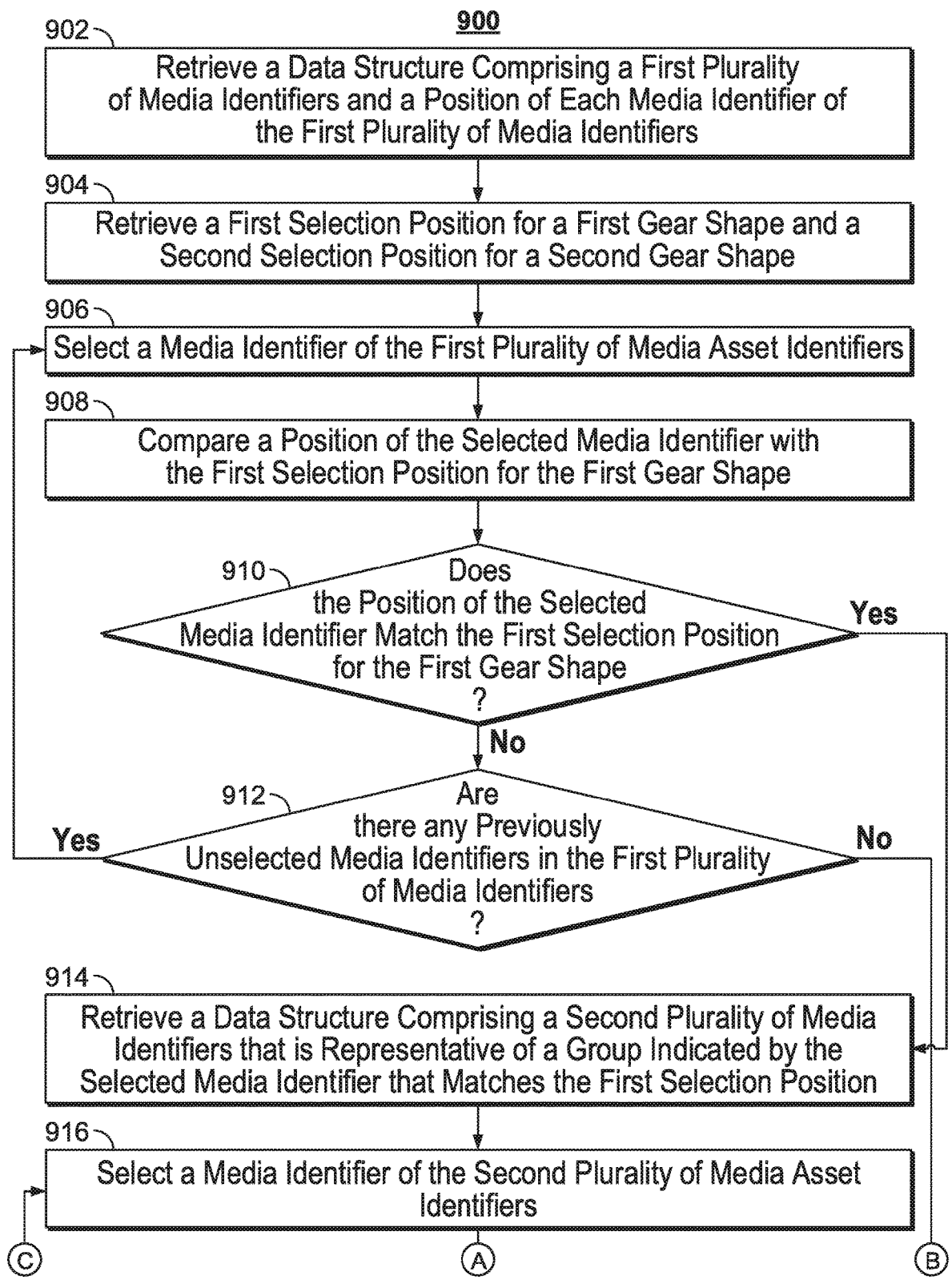
FIG. 9 is a flowchart of an illustrative process for providing a gear-based user interface for media content navigation, in accordance with some embodiments of the disclosure.
Figure 9:
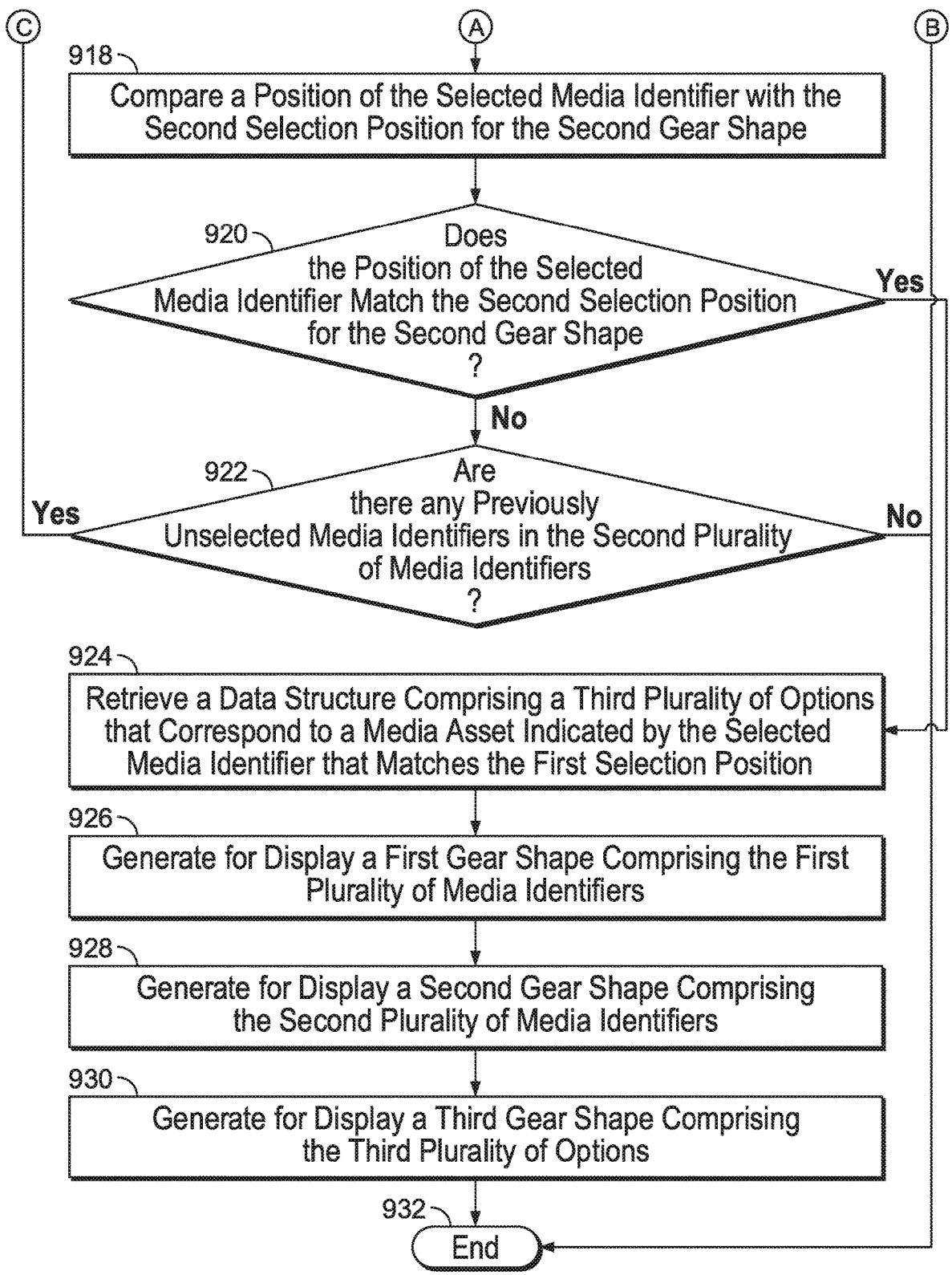

FIG. 9 is a flowchart of an illustrative process 900 for providing a gear-based user interface for media content navigation, in accordance with some embodiments of the disclosure. At 902, control circuitry 604 retrieves a data structure comprising a first plurality of media identifiers and a position of each media identifier of the first plurality of media identifiers. For example, the data structure may be stored in storage 608 or media source 706. A media identifier may be represented in the data structure as an alphanumeric string, a hexadecimal code, and/or other representation. The media identifier may be associated with metadata for the media identifier. A position of a media identifier may be represented in the data structure with a number within a range (e.g., a number from 1 to 8, where there are eight media identifiers), an alphanumeric string (e.g., "top left", "bottom right"), a hexadecimal code, a set of pixel location coordinates, a degree value (e.g., 90 degrees), and/or other representation.

At 904, control circuitry 604 retrieves a first selection position for a first gear shape and a second selection position for a second gear shape. The first and second selection positions may be stored in, for example, storage 608, media source 706, and/or processing server 708. As discussed above, the positions may be represented with a number within a range, an alphanumeric string, a hexadecimal code, a set or range of pixel location coordinates, a degree value, and/or other representation.

At 906, control circuitry 604 selects a media identifier of the first plurality of media asset identifiers. For example, control circuitry 604 may implement an iterator that cycles through the media identifiers and selects each media identifier one by one without repetition. At 908, control circuitry 604 compares a position of the selected media identifier with the first selection position for the first gear shape. For example, control circuitry 604 may determine whether there is an exact match between the positions. In another example, control circuitry 604 may determine whether a difference between the positions is less than a threshold value. In another example, control circuitry 604 may determine whether the difference between the positions is less than each of the other differences between the first selection position and each position of the other, non-selected media identifiers.

At 910, control circuitry 604 determines whether the position of the selected media identifier matches the first selection position for the first gear shape. A match may include an exact match between the positions, a determination that the difference between the positions is less than a threshold value, a determination that the difference between the positions is less than other differences for other media identifiers, or another determination of a match. If the positions match, process 900 proceeds to 914. Otherwise, process 900 proceeds to 912. At 912, control circuitry 604 determines whether there are any previously unselected media identifiers in the first plurality of media identifiers. For example, control circuitry 604 may determine whether an iterator has iterated through all of the media identifiers or whether there is still a media identifier that the iterator has not selected yet. If control circuitry determines that there are previously unselected media identifiers in the first plurality, process 900 proceeds to 906. Otherwise, process 900 proceeds to 932.

At 914, control circuitry 604 retrieves a data structure comprising a second plurality of media identifiers that is representative of a group indicated by the selected media identifier that matches the first selection position. For example, control circuitry 604 may, upon determining the selected media identifier that matches the first selection position, transmit a request for media identifiers that are representative of a group indicated by the selected media identifier, and receive, in response to the request, the data structure comprising the second plurality of media identifiers. As described above, the data structure may be stored in storage 608 or media source 706.

At 916, control circuitry 604 selects a media identifier of the second plurality of media asset identifiers, for example with an iterator, as described above. At 918, control circuitry 604 compares a position of the selected media identifier with the second selection position for the second gear shape. At 920, control circuitry 604 determines whether the position of the selected media identifier matches the second selection position for the second gear shape. If the positions match, process 900 proceeds to 924. Otherwise, process 900 proceeds to 922. At 922, control circuitry 604 determines whether there are any previously unselected media identifiers in the second plurality of media identifiers. If there are, process 900 proceeds to 916. Otherwise, process 900 proceeds to step 932.

At 924, control circuitry 604 retrieves a data structure of a third plurality of options that correspond to a media asset indicated by the selected media identifier that matches the first selection position. The data structure may be stored in storage 608 or media source 706. An option may be represented in the data structure as an alphanumeric string, a hexadecimal code, and/or other representation. The option may be an action that can be performed with respect to a media asset, such as a playback option, an option to view additional information or metadata for a media asset, an option to add the media asset to a list, etc. Each option may have a position that may be represented as a number within a range, an alphanumeric string, a hexadecimal code, a set of pixel location coordinates, a degree value, and/or other representation.

At 926, control circuitry 604 and/or display generation circuitry 607 generates for display a first gear shape comprising the first plurality of media identifiers. At 928, control circuitry 604 and/or display generation circuitry 607 generates for display a second gear shape comprising the second plurality of media identifiers. At 930, control circuitry 604 and/or display generation circuitry 607 generates for display a third gear shape comprising the third plurality of options. At 932, process 900 ends.

Figure 10:
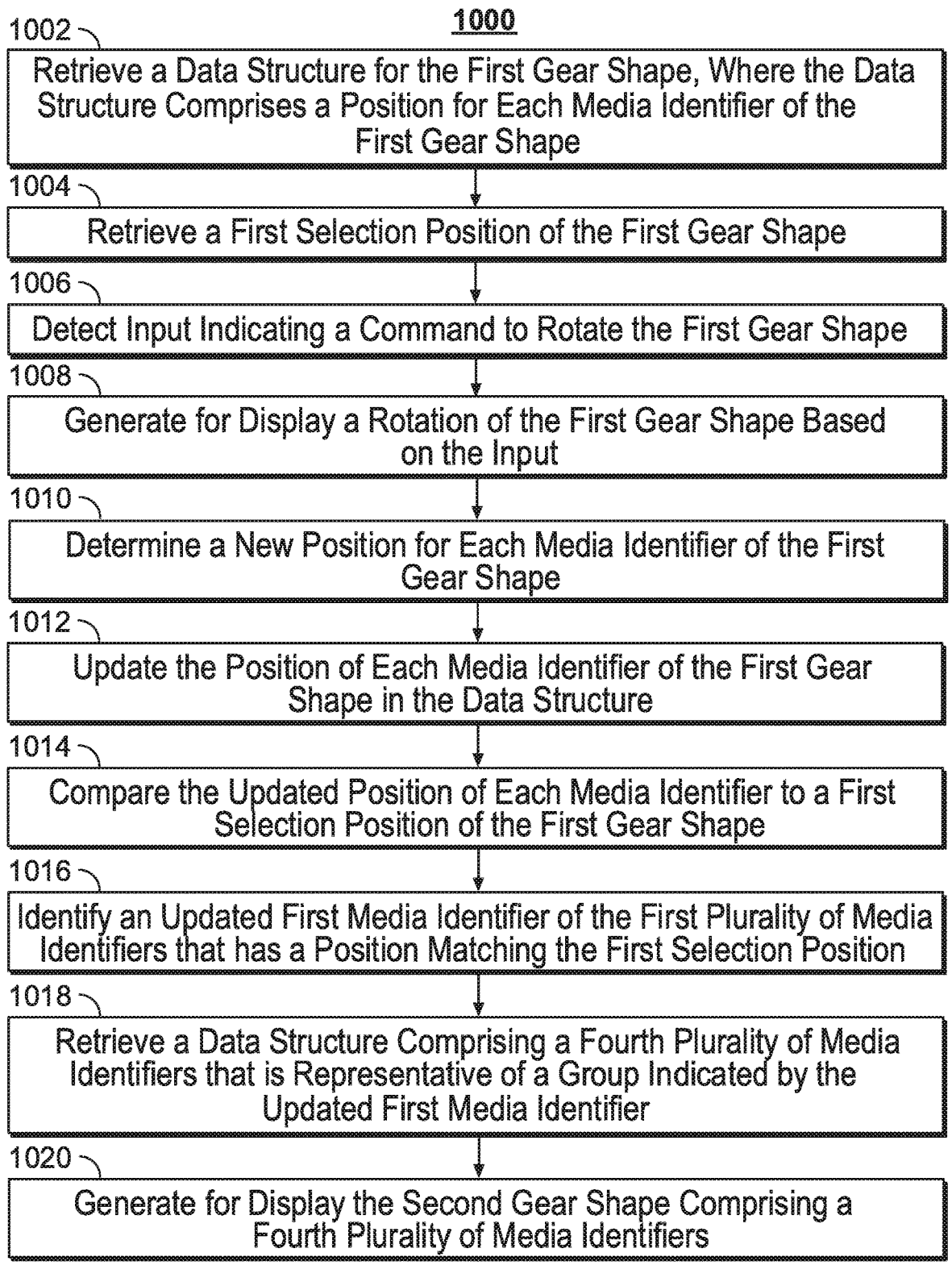
FIG. 10 is a flowchart of an illustrative process for updating media identifier positions based on a rotation of a gear shape, in accordance with some embodiments of the disclosure.

FIG. 10 is a flowchart of an illustrative process 1000 for updating media identifier positions based on a rotation of a gear shape, in accordance with some embodiments of the disclosure. As discussed above in relation to FIG. 6, a media identifier position may be represented as a number within a range, an alphanumeric string, a hexadecimal code, a set of pixel location coordinates, a degree value, and/or other representation. At 1002, control circuitry 604 retrieves a data structure for the first gear shape, wherein the data structure comprises a position for each media identifier of the first gear shape. The data structure may be retrieved from storage 608 or media source 706. For example, the data structure may include positions 1, 2, 3, and 4 for four respective media identifiers of the first gear shape. In another example, the data structure may include positions "0", "90", "180", and "270" for four respective media identifiers. In yet another example, the data structure may include positions "(0, 1)", "(1, 0)", "(0, −1)", and "(−1, 0)" for four respective media identifiers.

At 1004, control circuitry 604 retrieves a first selection position of the first gear shape. Respective to the examples above in 1002, the first selection position may be, for example, "1", "0", or "(0, 1)". The first selection position may be stored in the data structure for the first gear shape or elsewhere in storage 608 or media source 706.

At 1006, control circuitry 604 detects input indicating a command to rotate the first gear shape. At 1008, control circuitry 604 generates for display a rotation of the first gear shape based on the input. Input indicating a rotation of a gear shape, as well as the rotation of a gear shape itself, are described above in relation to FIG. 5. At 1010, control circuitry 604 determines a new position for each media identifier of the first gear shape. For example, control circuitry 604 may iterate through the positions included in the data structure for the first gear shape and determine which media identifier is now in that position. At 1012, control circuitry 604 updates the position of each media identifier of the first gear shape in the data structure. For example, control circuitry 604 may reassign the position values of each media identifier in the data structure to the new positions.

At 1014, control circuitry 604 compares the updated position of each media identifier to a first selection position of the first gear shape. At 1016, control circuitry 604 identifies an updated first media identifier of the first plurality of media identifiers that has a position matching the first selection position of the first gear shape. In one example, media identifiers "A", "B", "C", and "D" of a first gear shape may originally have positions "1", "2", "3", and "4", respectively, where "1" is the first selection position, thereby resulting in "A" being the selected media identifier. Following a rotation of the gear shape, media identifiers "A", "B", "C", and "D" may have updated positions "3", "4", "1", and "2", respectively, thereby resulting in "C" being the newly selected media identifier.

At 1018, control circuitry 604 retrieves a data structure comprising a fourth plurality of media identifiers that is representative of a group indicated by the updated first media identifier. For example, the fourth plurality of media identifiers may be a group indicated by media identifier "C". At 1020, control circuitry 604 generates for display the second gear shape comprising the fourth plurality of media identifiers. For example, the second gear shape may originally include a plurality of media identifiers representative of a group indicated by media identifier "A". This group may be replaced by the group indicated by media identifier "C" following the rotation.

Figure 11:
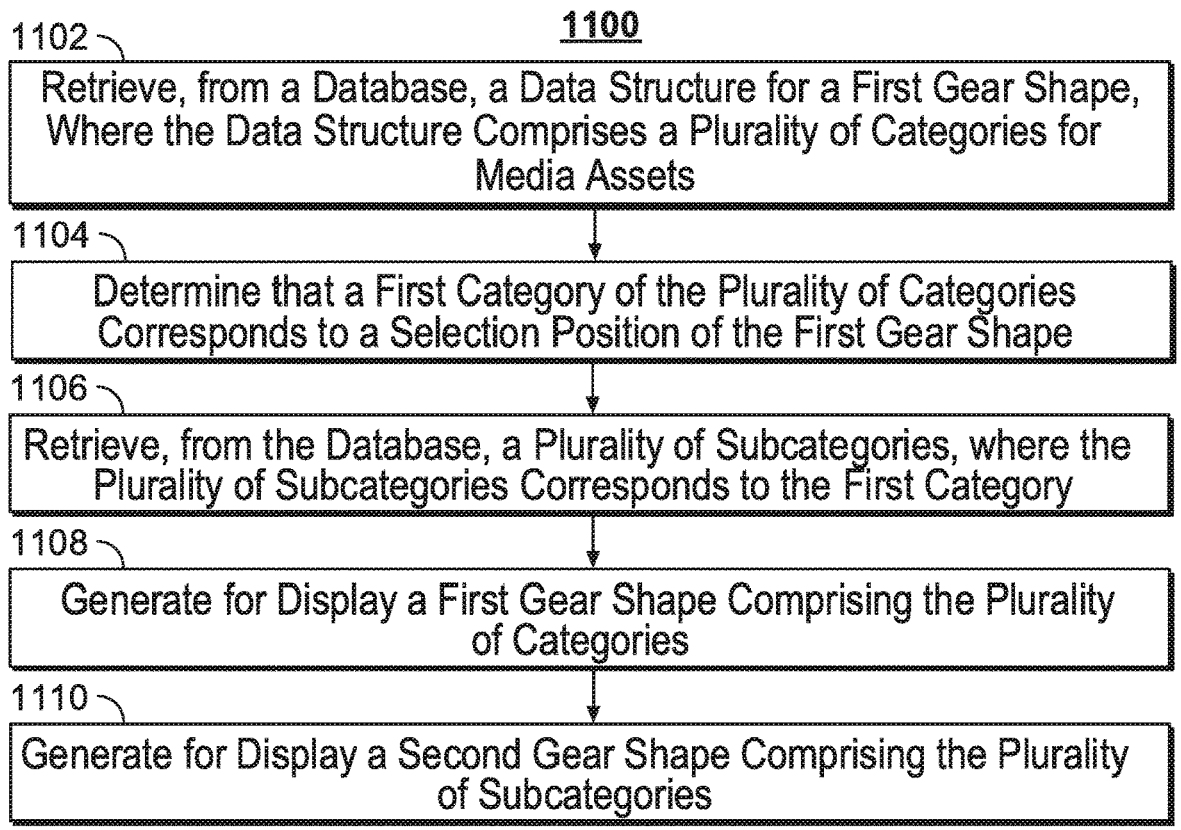
FIG. 11 is a flowchart of an illustrative process for providing a gear-based user interface for categories and subcategories of media assets, in accordance with some embodiments of the disclosure.

FIG. 11 is a flowchart of an illustrative process 1100 for providing a gear-based user interface for categories and subcategories of media assets, in accordance with some embodiments of the disclosure. At 1102, control circuitry 604 retrieves, from a database, a data structure for a first gear shape, wherein the data structure comprises a plurality of categories of media assets. The database may be local to media device 600/601/702 or external to the media device and accessed via communications network 704. A category of media assets may be a genre, a provider, a producer, a channel, or other category determined by metadata. At 1104, control circuitry 604 determines that a first category of the plurality of categories corresponds to a selection position of the first gear shape.

At 1106, control circuitry 604 retrieves, from the database, a plurality of subcategories, wherein the plurality of subcategories corresponds to the first category. A subcategory may be, for example, a program or media asset such as a television show, movie, etc. At 1108, control circuitry 604 generates for display a first gear shape comprising the plurality of categories. At 1110, control circuitry 604 generates for display a second gear shape comprising the plurality of subcategories. The generation for display of the first and second gear shapes is described in further detail above in relation to FIGS. 8 and 9.

It should be noted that processes 800-1100 or any step thereof could be performed on, or provided by, any of the devices shown in FIGS. 6-7. For example, the processes may be executed by control circuitry 604 (FIG. 6) as instructed by a media guidance application implemented on media device 702 and/or processing server 708. In addition, one or more steps of a process may be incorporated into or combined with one or more steps of any other process or embodiment (e.g., steps from process 800 may be combined with steps from process 1100). In addition, the steps and descriptions described in relation to FIGS. 8-11 may be done in alternative orders or in parallel to further the purposes of this disclosure. For example, each of these steps may be performed in any order or in parallel or substantially simultaneously to reduce lag or increase the speed of the system or method.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may reference "convention," any such reference is merely for the purpose of providing context to the invention(s) of the instant disclosure, and does not form any admission as to what constitutes the state of the art.

What is claimed is:

1. A user equipment device comprising:
   display generator circuitry configured to generate for display:
      a first plurality of media identifiers,
      a second plurality of media identifiers, wherein the second plurality of media identifiers is representative of a group indicated by a first media identifier, and
      a third plurality of options with respect to a media asset indicated by a second media identifier; and
   control circuitry configured to:
      upon input indicating that the first plurality of media identifiers is to be rotated, cause the display generator circuitry to rotate the second plurality of media identifiers with the first plurality of media identifiers based on a rotation of the first plurality of media identifiers, such that a position of each of the first plurality of media identifiers changes along a first circular path while continuing to be generated for display and a position of each of the second plurality of media identifiers changes along a second circular path while continuing to be generated for display, wherein rotating the second plurality of media identifiers comprises synchronizing rotation of the second plurality of media identifiers with the first plurality of media identifiers wherein the second plurality of media identifiers are rotated in an opposite direction of the first plurality of media identifiers, wherein synchronizing the rotation comprises moving in a first direction the second plurality of media identifiers by a first number of positions which is interpolated from a number of positions the first plurality of media identifiers was moved in an opposite direction.

2. The device of claim 1, wherein the display generator circuitry is further configured to generate for display:
a first gear shape comprising the first plurality of media identifiers, wherein each of the first plurality of media identifiers corresponds to a cog of a first plurality of cogs of the first gear shape;
a second gear shape comprising the second plurality of media identifiers, wherein each of the second plurality of media identifiers corresponds to a cog of a second plurality of cogs of the second gear shape;
a third gear shape comprising the third plurality of options;
wherein the input indicating that the first plurality of media identifiers is to be rotated is an input indicating that the first gear shape is to be rotated;
wherein the first gear shape further comprises a first selection position, wherein the first cog corresponding to the first media identifier is in the first selection position, and
wherein the second gear shape further comprises a second selection position, wherein the second cog corresponding to the second media identifier is in the second selection position.

3. The device of claim 2, wherein the display generator circuitry is further configured to generate for display:
a fourth gear shape, of a size smaller than the first shape, overlaying the first gear shape, the fourth gear shape comprising the first media identifier of the first plurality of media identifiers, and
a fifth gear shape, of a size smaller than the second gear shape, overlaying the second gear shape, the fifth gear shape comprising the second media identifier of the second plurality of media identifiers.

4. The device of claim 3, wherein the control circuitry is further configured, further upon the input indicating that the first gear shape is to be rotated, to:
based on the rotation of the first gear shape, cause the display generator circuitry to update the fourth gear shape based on an updated first media identifier of the first gear shape, and
based on the rotation of the second gear shape, cause the display generator circuitry to update the fifth gear shape based on an updated second media identifier of the second gear shape.

5. The device of claim 2, wherein the control circuitry is further configured, based on the rotation of the first gear shape, to:
select an updated first media identifier of the first plurality of media identifiers of the first gear shape;
determine, based on the updated first media identifier, a fourth plurality of media identifiers that are representative of a group indicated by the updated first media identifier; and
cause the display generator circuitry to generate for display the second gear shape with the fourth plurality of media identifiers replacing the second plurality of media identifiers.

6. The device of claim 5, wherein the control circuitry is configured, when determining the fourth plurality of media identifiers that are representative of the group indicated by the updated first media identifier, to:
determine whether the first gear shape has stopped rotating;
in response to determining that the first gear shape has stopped rotating, detect a third cog corresponding to the updated first media identifier is in the first selection position;
transmit a request for the fourth plurality of media identifiers, wherein the request comprises the updated first media identifier; and
receive, in response to the request, the fourth plurality of media identifiers.

7. The device of claim 2, wherein the first plurality of media identifiers corresponds to a plurality of categories of media assets, and wherein the second plurality of media identifiers corresponds to a plurality of subcategories of media assets, and wherein the control circuitry is further configured to:
retrieve, from a database, the plurality of categories of media assets;
determine the first media identifier corresponding to the first cog corresponds to a first category of the plurality of categories;
retrieve, from the database, the plurality of subcategories, wherein the plurality of subcategories corresponds to the first category; and
cause the display generator circuitry to generate for display the plurality of categories on the first gear shape and the plurality of subcategories on the second gear shape.

8. The device of claim 1, wherein the first plurality of media identifiers corresponds to a plurality of categories of media assets, and wherein the second plurality of media identifiers corresponds to a plurality of subcategories of media assets.

9. The device of claim 1, wherein:
the first plurality of media identifiers corresponds to a plurality of channels,
the second plurality of media identifiers corresponds to a plurality of programs, and
the third plurality of options corresponds to a plurality of program actions.

10. The device of claim 1, wherein the first plurality of media identifiers is to be rotated about a first apparent axis and the second plurality of media identifiers is rotated about second apparent axis, the first apparent axis being different from the second apparent axis.

11. The device of claim 1, wherein the interpolation is bilinear interpolation.

12. A method for generating for display a gear based user interface, the method comprising:

generating for display a first plurality of media identifiers;
generating for display a second plurality of media identifiers, wherein the second plurality of media identifiers is representative of a group indicated by a first media identifier;
generating for display a third plurality of options with respect to a media asset indicated by a second media identifier; and
upon input indicating that the first plurality of media identifiers is to be rotated, rotating the second plurality of media identifiers with the first plurality of media identifiers based on a rotation of the first plurality of media identifiers, such that a position each of the first plurality of media identifiers changes along a first circular path while continuing to be generated for display and a position of each of the second plurality of media identifiers changes along a second circular path while continuing to be generated for display,
wherein rotating the second plurality of media identifiers comprises synchronizing rotation of the second plurality of media identifiers with the first plurality of media identifiers wherein the second plurality of media identifiers are rotated in an opposite direction of the first plurality of media identifiers, wherein synchronizing the rotation comprises moving in a first direction the second plurality of media identifiers by a first number of positions which is interpolated from a number of positions the first plurality of media identifiers was moved in an opposite direction.

13. The method of claim 12, further comprising:
Generating for display a first gear shape comprising the first plurality of media identifiers, wherein each of the first plurality of media identifiers corresponds to a cog of a first plurality of cogs of the first gear shape;
generating for display a second gear shape comprising the second plurality of media identifiers, wherein each of the second plurality of media identifiers corresponds to a cog of a second plurality of cogs of the second gear shape;
generating for display a third gear shape comprising the third plurality of options;
wherein the input indicating that the first plurality of media identifiers is to be rotated is input indicating that the first gear shape is to be rotated;
wherein the first gear shape further comprises a first selection position, wherein the first cog corresponding to the first media identifier is in the first selection position; and
wherein the second gear shape further comprises a second selection position, wherein the second cog corresponding to the second media identifier is in the second selection position.

14. The method of claim 12, further comprising:
generating for display a fourth gear shape, of a size smaller than the first gear shape, overlaying the first gear shape, the fourth gear shape comprising the first media identifier of the first plurality of media identifiers; and
generating for display a fifth gear shape, of a size smaller than the second gear shape, overlaying the second gear shape, the fifth gear shape comprising the second media identifier of the second plurality of media identifiers.

15. The method of claim 14, wherein the first gear shape, the second gear shape, and the third gear shape are of a first size, and wherein the fourth gear shape and the fifth gear shape are of a second size smaller than the first size.

16. The method of claim 14, further comprising, upon the input indicating that the first gear shape is to be rotated:
based on the rotation of the first gear shape, updating the fourth gear shape based on an updated first media identifier of the first gear shape, and
based on the rotation of the second gear shape, updating the fifth gear shape based on an updated second media identifier of the second gear shape.

17. The method of claim 13, further comprising, based on the rotation of the first gear shape:
selecting an updated first media identifier of the first plurality of media identifiers of the first gear shape;
determining, based on the updated first media identifier, a fourth plurality of media identifiers that are representative of a group indicated by the updated first media identifier; and
replacing the second plurality of media identifiers of the second gear shape with the fourth plurality of media identifiers.

18. The method of claim 17, further comprising:
wherein determining the fourth plurality of media identifiers that are representative of the group indicated by the updated first media identifier comprises:
determining whether the first gear shape has stopped rotating;
in response to determining that the first gear shape has stopped rotating, detecting a third cog corresponding to the updated first media identifier is in the first selection position;
transmitting a request for the fourth plurality of media identifiers, wherein the request comprises the updated first media identifier; and
receiving, in response to the request, the fourth plurality of media identifiers.

19. The method of claim 13, wherein the first plurality of media identifiers corresponds to a plurality of categories of media assets, and wherein the second plurality of media identifiers corresponds to a plurality of subcategories of media assets, and wherein the method further comprises:
retrieving, from a database, the plurality of categories of media assets;
generating for display the plurality of categories on the first gear shape;
determining the first media identifier corresponding to the first cog corresponds to a first category of the plurality of categories;
retrieving, from the database, the plurality of subcategories, wherein the plurality of subcategories corresponds to the first category; and
generating for display the plurality of subcategories on the second gear shape.

20. The method of claim 12, wherein the first plurality of media identifiers corresponds to a plurality of categories of media assets, and wherein the second plurality of media identifiers corresponds to a plurality of subcategories of media assets.

21. The method of claim 12, wherein:
the first plurality of media identifiers corresponds to a plurality of channels,
the second plurality of media identifiers corresponds to a plurality of programs, and
the third plurality of options corresponds to a plurality of program actions.

22. The method of claim 12, wherein the first plurality of media identifiers is to be rotated about a first apparent axis and the second plurality of media identifiers is rotated about second apparent axis, the first apparent axis being different from the second apparent axis.

* * * * *